United States Patent
Porter

[15] 3,655,311
[45] Apr. 11, 1972

[54] APPARATUS FOR PRODUCING ISOTROPIC FOAMED SYNTHETIC RESIN STOCK

[72] Inventor: Lawrence Christie Porter, Palos Verdes Peninsula, Calif.
[73] Assignee: The Upjohn Company, Kalamazoo, Mich.
[22] Filed: May 13, 1970
[21] Appl. No.: 37,421

Related U.S. Application Data

[63] Continuation of Ser. No. 579,053, Sept. 13, 1966.

[52] U.S. Cl. ..............................425/115, 264/47, 425/115, 425/817, 425/168, 425/308, 425/166
[51] Int. Cl. ..........................................B29d 27/04
[58] Field of Search........................18/4 B, 5 P, 6 E

[56] References Cited

UNITED STATES PATENTS

| | | | |
|---|---|---|---|
| 3,067,456 | 12/1962 | Himmelheber et al. | 18/4 B |
| 1,949,175 | 2/1934 | Netzel | 18/6 E |
| 2,176,945 | 10/1939 | Roberts | 18/6 E |
| 2,441,235 | 5/1948 | Blair et al. | 18/4 B |
| 2,816,741 | 12/1957 | Shuffman | 18/4 B X |
| 2,975,470 | 3/1961 | Snelson et al. | 18/4 B |
| 3,093,232 | 6/1963 | Kornylak | 18/4 B |
| 3,123,856 | 3/1964 | Dye et al. | 18/4 B |
| 3,124,835 | 3/1964 | Celano et al. | 18/4 B |
| 3,152,361 | 10/1964 | Edwards | 18/4 B |
| 3,214,794 | 11/1965 | Otis | 18/5 P |
| 3,215,581 | 11/1965 | Carlson et al. | 18/5 P |
| 3,276,072 | 10/1966 | Politzer et al. | 18/4 B |
| 3,310,616 | 3/1967 | Beary | 18/4 B |
| 3,313,010 | 4/1967 | Betz | 18/4 B X |
| 3,319,937 | 5/1967 | Wilson et al. | 18/5 P X |
| 3,325,823 | 6/1967 | Boon | 18/4 B X |

*Primary Examiner*—H. A. Kilby, Jr.
*Attorney*—Donald H. Fidler and Edmund F. Bard

[57] ABSTRACT

This invention relates to the production of cellular synthetic resin stock, and more particularly relates to methods and apparatus for producing foamed synthetic resin stock, especially polyurethane foam, having a substantially rectangular cross section and which is generally isotropic in character.

12 Claims, 11 Drawing Figures

Lawrence C. Porter
INVENTOR.

BY Arnold & Roylance
ATTORNEYS

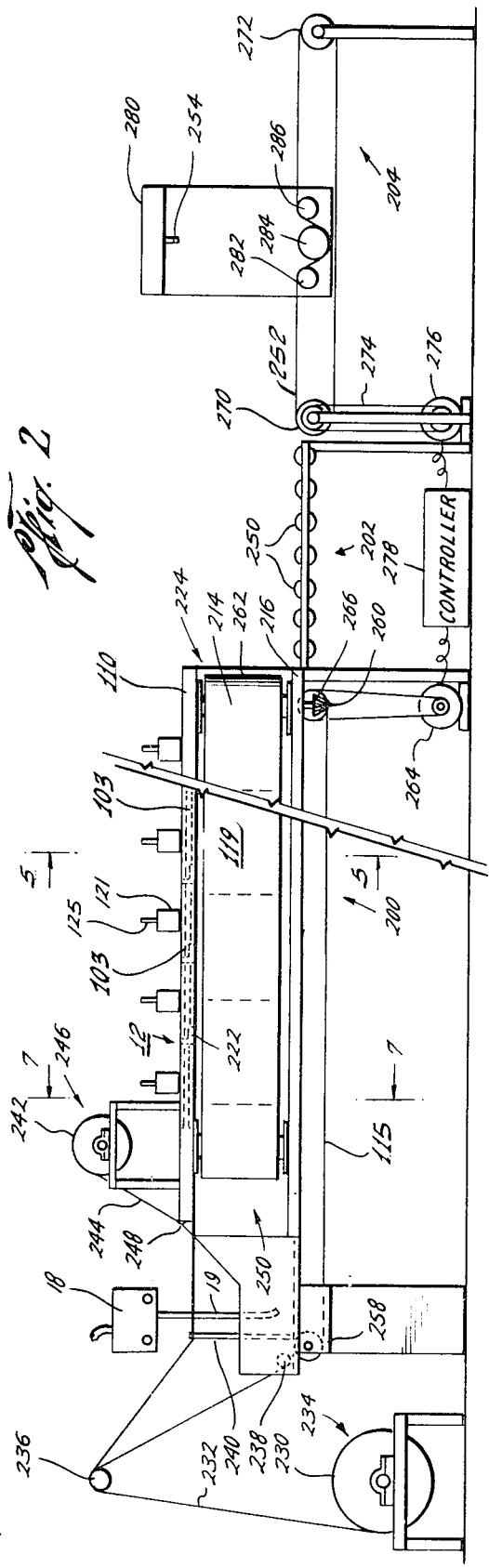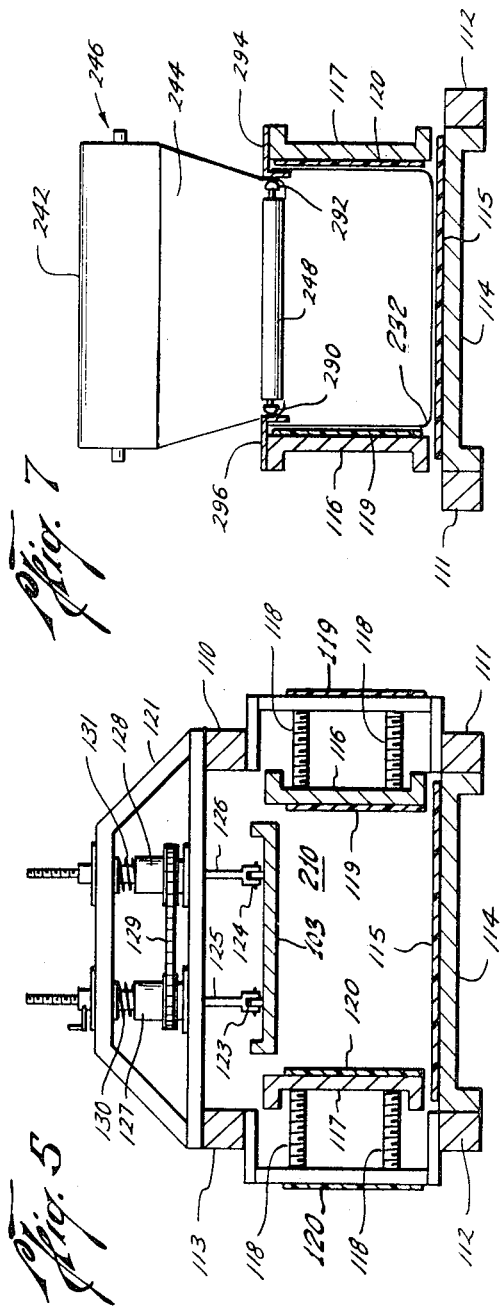

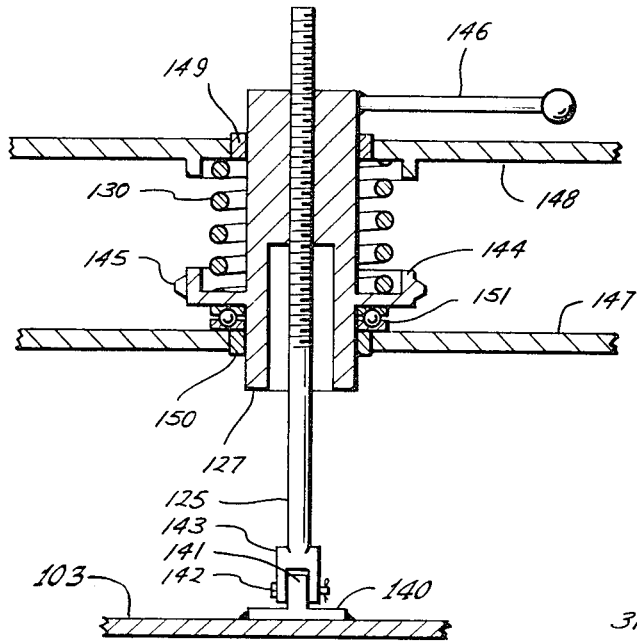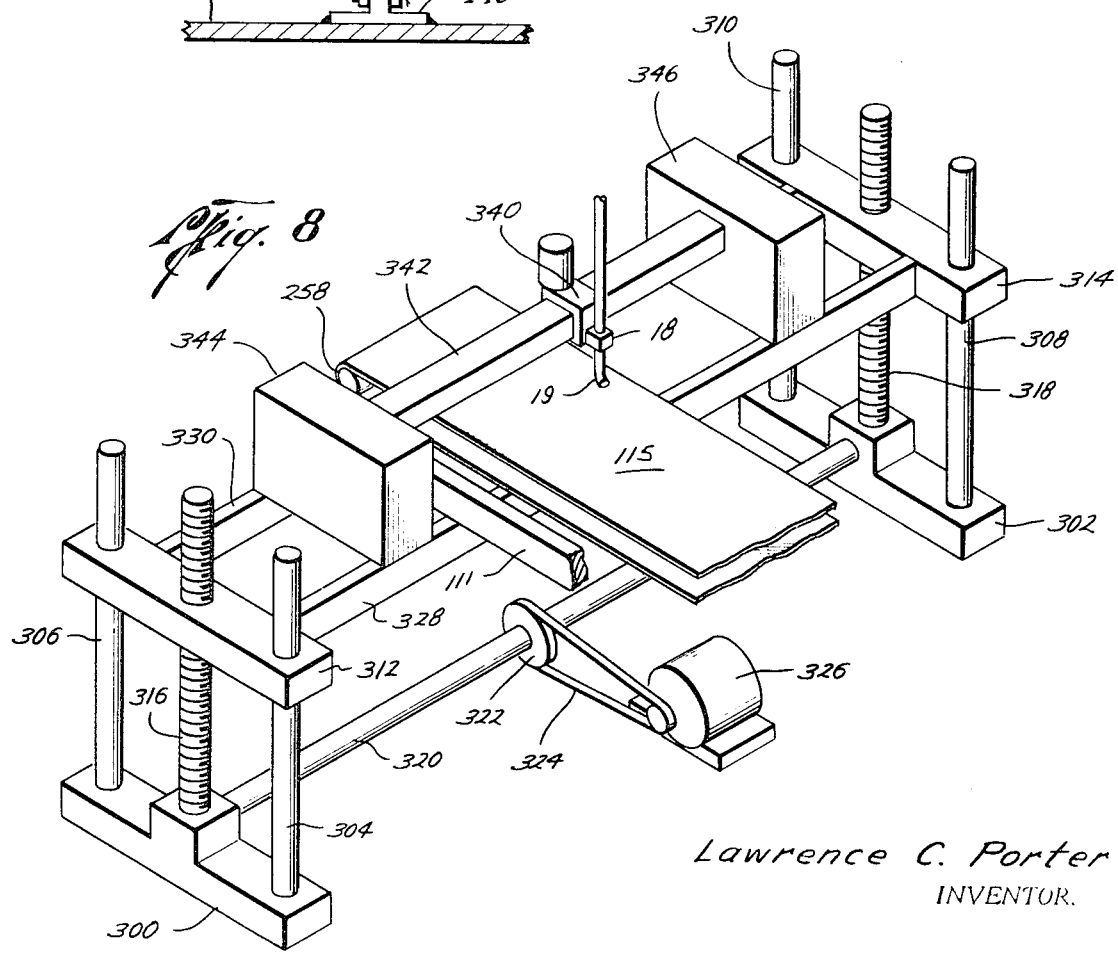

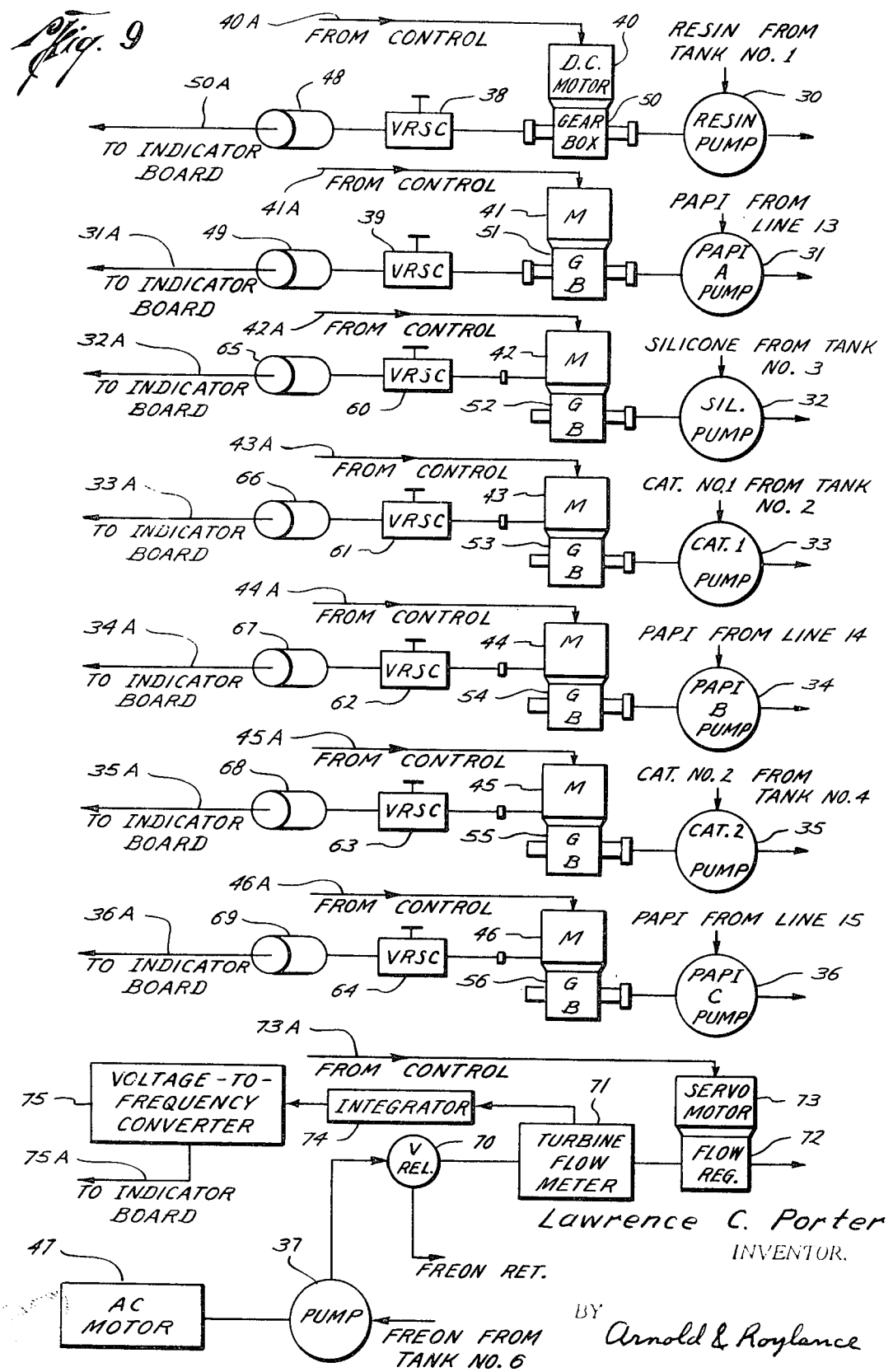

APPARATUS FOR PRODUCING ISOTROPIC FOAMED SYNTHETIC RESIN STOCK

This application is a streamlined continuation of application, Ser. No. 579,053, filed Sept. 13, 1966.

It is well known to produce urethane foam stock by combining a suitable polyhydroxyl compound, a blowing agent such as freon, and a polyisocyanate, to produce a foam which solidifies into a cellular material. It is also well known to at least partially confine such foam, during its hardening process, to produce stock (hereinafter referred to as "bun") which is thereafter cut into smaller pieces or billets for sale to fabricators.

Depending upon the choice of the polyhydroxyl (hereinafter referred to generally as the "resin"), the bun can be made either rigid or flexible. The structure of urethane foams, whether rigid or flexible, consists of a network of cells which are preferably of a substantially uniform size and shape. In flexible foams, the cells are open. In rigid foams, however, the cell structure is closed. If the rigid foam material is intended for certain purposes such as thermal insulation, substantially uniform cell structure is greatly desired in order to provide uniform compressive yield strength characteristics which are substantially the same along the X, Y, and Z directional axes along which a force may be applied.

As hereinbefore mentioned, polyurethane foam is produced by the polymerization of the resin and the selected isocyanate. The freon is added to produce the leavening effect which causes the resulting polyurethane mass to "rise" and to assume the cellular character sought to be obtained. Hence, all polyurethane foam manufacturing techniques generally comprise the steps of disposing the resin, isocyanate and freon mixture, in a restricted or partially restricted enclosure to create a bun having generally preselected cross-sectional dimensions. More particularly, the liquid mixture of resin, isocyanate and freon is preferably poured onto a moving conveyor (such as an endless belt) which carries the mixture into and through a tunnel-like enclosure or mold as it rises and solidifies. In other words, the mixture rises within the tunnel, but the cross-sectional dimensions of the tunnel tend to restrict the bun and give it the cross-sectional shape and dimension sought to be obtained, as well as to apply a preselected pressure to the foam to control the shape of the cells and the homogeneity of the foam.

As the completed bun is carried out of the exit end of the tunnel, it may be cut into preselected lengths or billets which may then be sold to fabricators who will cut the billets into such shapes as may be desired by the ultimate consumers. However, since most of the billets are intended to be cut into slabs or planks which also have rectangular cross sections, it will be apparent that waste will occur unless the bun itself has a generally rectangular cross section, since any rounded or irregular side portions must usually be discarded.

Methods and apparatus for commercially producing an isotropic polyurethane bun having a preselected density and compressive strength, and also having a substantially rectangular cross section, have long been sought. Prior art techniques have succeeded in commercially producing buns which are generally satisfactory from the standpoint of density and compressive strength. Furthermore, buns having substantially rectangular cross section have also been produced in commercial quantities, although only at a considerable effort, and at a cost which is not competitive with the cost of non-rectangular buns. However, it has hitherto been impossible, with the methods and apparatus of the prior art, to commercially produce a rectangular bun having the desired density and compressive strength characteristics, and at a cost which is competitive with the price of nonrectangular buns.

In addition to the basic foam constituents hereinbefore mentioned, it has been found desirable to include certain other materials in the mixture to produce a polyurethane foam having ideal properties. For example, a surfactant such as polyoxyalkylene-polydimethylsiloxane (hereinafter referred to as "silicone") is usually included in selected amounts to regulate cell size and cell wall stability during foaming. Water is included in regulated amounts to give the foam the proper degree of "flowability," during the leavening stage, so that the bun will fill the upper corners of the tunnel and thus assume a substantially rectangular cross section. Catalysts such as triethylamine and castor oil are also usually included in proper proportions to achieve the desirable balance between the foaming and polymerization reactions, and to control the speed of such reactions. Coloring substances may also be included in the resin isocyanate mixture.

Notwithstanding the use of these other catalysts and constituents, it should be appreciated that the basic reaction between the resin and the polyisocyanate is relatively quite rapid and is thus quite difficult to control during commercial manufacture of polyurethane bun. Although a one-shot process is theoretically the most efficient for the commercial manufacture of polyurethane, it has been found necessary for the most part to employ either semiprepolymer or complete prepolymer systems in order to produce an isotropic bun having the proper characteristics of density, compressive strength, rectangular cross-sectional configuration, etc.

These disadvantages of the prior art are overcome with the present invention, and novel methods and apparatus are provided herein for commercially manufacturing either flexible or rigid homogeneous polyurethane bun, which is isotropic, and which has such other preselected chemical and physical properties as may be desired. It is also a feature of the present invention to provide novel methods and apparatus for commercially manufacturing flexible or rigid polyurethane bun having preselected characteristics and properties by means of a one-shot process. It is a further feature of the present invention to provide improved one-shot methods and apparatus for commercially manufacturing polyurethane bun wherein improved control methods and apparatus are provided and employed for more quickly and effectively regulating the quantity and characteristics of the bun.

These advantages of the present invention are preferably obtained by novel methods and apparatus employing a one-shot system, wherein improved monitoring methods and apparatus are provided for directly and accurately indicating and regulating the proportions of the various constituents in terms of mass transfer units, for selectively adjusting the inclination angle of the tunnel during operation of the system and process, for raising and lowering the pouring spout and the input end of the tunnel as a unit in order to maintain a preselected spacing between the spout and the floor of the tunnel, for synchronizing the conveyor speed and the saw movement, and for providing lateral as well as vertical saw movement.

These and other advantages and features of the present invention will be apparent from the following detailed description, wherein reference is made to the FIGURES in the accompanying drawings:

In the Drawings:

FIG. 2 is a pictorial representation of the major components of the preferred system employed for manufacturing polyurethane billets by means of the present invention.

FIG. 5 is a pictorial representation taken along line 5-5 of FIG. 2 of another portion of the system employed to produce polyurethane bun by means of the present invention.

FIG. 6 is a pictorial representation, partly in cross section, of certain details of the apparatus depicted in FIG. 5.

FIG. 7 is a pictorial representation, taken along line 7-7 of FIG. 2, partly in cross section, of another portion of the apparatus depicted in FIG. 2.

FIG. 8 is a functional representation, partly pictorial, of another portion of the apparatus generally depicted in FIG. 2.

FIG. 9 is a functional representation of a system for monitoring and controlling the mixing of the constituents generally depicted and represented in FIG. 1.

Figure 1:
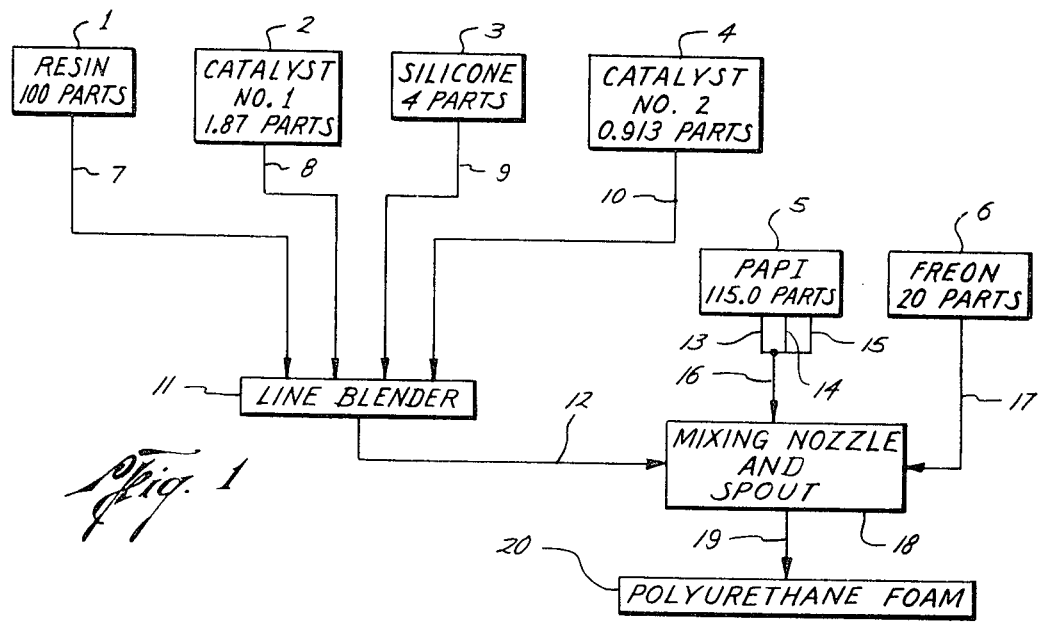
FIG. 1 is a basic flow diagram showing mixing stages employed in a one-shot method and system for manufacturing polyurethane bun by means of the present invention.

Referring now to FIG. 1, there may be seen a suitable arrangement of tanks 1–6, wherein tanks 1–4 have their output lines 7–10 connected to a conventional line blender 11. Tank 5 is preferably provided with three separate output lines 13–15 which connect into a single line 16, by means of a manifold (not depicted in FIG. 1) and tank 6 may be provided with a single output line 17.

As depicted in FIG. 1, tank 1 contains resin, tank 2 may contain a first catalyst such as a 60:40 mixture of castor oil and a suitable amine, tank 3 contains silicone, and tank 4 contains a second catalyst which may be a 50:50 mixture of water and a selected resin. As hereinbefore stated, the output lines from tanks 1–4 are preferably connected to the line blender 11. Suitable pumping means (not depicted in FIG. 1) are provided to transfer resin, silicone and catalyst from tanks 1–4 to the line blender 11 at a preselected rate. For example, 100 parts of resin, 1.87 parts of the first catalyst, 4 parts of silicone, and 0.913 parts of the second catalyst may be sought to be transferred to provide a bun having such preselected physical and chemical characteristics as may be desired.

Tank 5 may be seen to contain a suitable polyisocyanate such as polymethylene polyphenylisocyanate, which will hereinafter be referred to as PAPI, (a registered trademark of the Upjohn Company). Tank 6 contains a suitable blowing or leavening agent such as freon. The output lines 13–17 from tanks 5 and 6, and the output line 12 from the line blender may be connected to a suitable mixing nozzle 18 such as that depicted in U.S. Pat. No. 2,948,928, wherein the various constituents are physically intermixed and then delivered to the aforementioned tunnel mold by means of a spout 19 to produce polyurethane foam 20.

It should be remembered that the resin in tank 1 and the PAPI in tank 5 rapidly interact when commingled in the mixing nozzle 18. Furthermore, it should be noted that freon tends to cause the other constituents in the mixture passing between the blender 11 and the mixing nozzle 18 to separate. Since the isotropicity of the bun depends in large part upon the thorough intermixing of all constituents before the polymerization interaction can proceed to any substantial degree, it is an advantage to first intermix those constituents which do not interact, (the resin, silicone and catalysts), and thereafter be required to intermix only three active ingredients or constituents in the mixing nozzle 18. Accordingly, this is why it is preferable to first intermix the constituents in tanks 1–4 in the line blender 11, and then combine only three separate "constituents" combined in the mixing nozzle 18.

The flow of liquid freon, from tank 6 to the mixing nozzle 18, may be provided by suitable pumping means as will hereinafter be described. Alternatively, tank 6 may be pressured by a nonreacting gas such as nitrogen, and the nitrogen pressure in tank 6 can be used to force the freon into and through the mixing nozzle 18 and spout 19.

Referring now to FIG. 2, there may be seen a functional and partly pictorial representation of an apparatus for receiving the mixture from the measuring spout 19 depicted in FIG. 1, and for forming the polyurethane foam into a proper bun. In particular, the system may be generally defined as being comprised of three main components, i.e., the tunnel mold section 200, a transitional conveyor section 202, and a saw assembly 204. It is a function of the tunnel mold section 200 to receive the mixture of resin, PAPI, freon, and catalysts, and to provide a mold wherein the mixture will foam up into a polyurethane bun having preselected dimensions and properties, and to properly wrap it in paper. It is the function of the transitional conveyor section 202, to conduct the "finished" and wrapped bun between the tunnel mold section 200 and the saw assembly 204, and it is the function of the saw assembly 204 to cut the finished and wrapped bun into polyurethane billets of a preselected length.

Referring now to the tunnel mold section 200, it may be seen in FIGS. 2 and 5 to be generally comprised of a tunnel 210 having right and left side conveyor belts 119 and 120 (only one belt being depicted in FIG. 2), a series of side panels 116 and 117 (only one side being depicted) disposed within the endless side belts, a bottom panel concealed within two bottom longitudinal struts 111 and 112, and a bottom conveyor belt 115, and a series of top panels 103 each supported by a truss-like brace 121 and shaft 125, and hidden between two top struts 110 and 113.

The bottom and side panels are rigidly held in position to form the bottom and sides of the tunnel 210. The top panels 103 are adjustably positioned to provide a tunnel having a preselected height. However, as will hereinafter be explained in greater detail, each top panel 103 is spring-loaded downward so as to yield to excessive upward pressure of the bun in the tunnel.

It should further be noted that each top panel 103 is provided with a lower protruding lip 222 (see FIG. 2), extending in the direction of movement of the bun through the tunnel 210 and projecting under the rear edge of the next adjacent top panel 103. This is provided so as to prevent the top panel 103 from impeding travel of the bun through the tunnel 210.

As may be seen in FIG. 2, there is preferably provided an endless bottom conveyor belt 115 rotatably mounted on the front and rear rollers 258 and 260 so as to rotate about the bottom panel. This bottom conveyor belt 115 is preferably synchronized with the side conveyor belts 119 and 120, as will hereinafter be explained, so as to conduct the bun through the tunnel 210 towards its exit end 224.

As will further be explained in detail, it is necessary as well as desirable that the bun be completely wrapped with paper or other suitable covering material as it passes out of the tunnel 210. Accordingly, roll 230 of bottom paper 232 is shown mounted on roller assembly 234, with the bottom paper 232 passing upward and over a top roller 236 and then downward and under a pair of creasing wheels 238, between two pairs of closely spaced, vertical support bars 240, whereby the bottom paper 232 assumes a U-shape as it passes under the spout 19 of the mixing nozzle 18. The two creasing wheels 238 are adjustably spaced apart a distance substantially equal to the width of the tunnel 210 so that the U-shaped bottom paper 232 will fit into the tunnel 210 without wrinkling. Thus the mixture of resin, PAPI, etc. received from the spout 19 is poured onto the bottom paper 232 rather than directly upon the endless bottom belt 115.

A narrower roll 242 of top paper 244 is located on a second roller assembly 246 mounted on top of the tunnel 210. As may be seen, the top paper 244 is passed downward under a rotatable creasing roller 248 to be formed into a U-shape before passing into and through the tunnel adjacent the bottom and side surfaces of the top panels 103.

As will hereinafter be discussed in detail, the tunnel mold section 200 is preferably inclinable with its pivot point located at or adjacent its exit end 224. Furthermore, when the entrance end 250 of the tunnel 210 is raised or lowered in order to vary its inclination, means hereinafter described in detail are preferably provided for maintaining a constant preselected spacing between the spout 19 and the bottom surface of the tunnel 210.

Means are preferably provided to move the mixing nozzle 18 and spout 19 backward and forward laterally across the bottom paper 232 at the entrance end 250 of the tunnel to thereby deposit a preselected constant stream of mixture evenly upon the bottom paper 232. The speed and traverse of the mixing nozzle 18 and spout 19 are preferably controlled to regulate the pattern of mixture being deposited, and the speed of the conveyor belts can also be selectively controlled, all to assist in regulating the volume of bun being produced. Moreover, the mixing nozzle 18 can be caused to dwell for a preselected interval, at the end of each traverse, so as to further regulate the pouring pattern to insure homogeneity of the bun being produced.

As hereinbefore stated, the bottom conveyor belt 115 and the side conveyor belts 119 and 120 cooperate to draw the bottom paper 232 into the tunnel. Thus, the liquid mixture deposited from the spout 19 on the bottom paper 232 is carried into the tunnel during the interval wherein it tends to leaven or foam up at a preselected rate so as to flow into the corners of the tunnel 210 and thus assume its proper shape and cellular form. When the foam has substantially filled the cross section of the tunnel 210, it tends to catch the top paper 244 and then draw the top paper 244 with it through the tunnel 210.

It should be understood that the volume or amount of polyurethane being produced is a function of the size and density of the bun. However, these characteristics, although controllable, are dependent upon many factors besides the proportions of the various constituents combined in the mixing nozzle 18. For example, factors such as the ambient temperature of the system, the flow rate of mixture from the spout 19 to the bottom paper 232, and the velocity of the lower belt 115, are also important. The ambient temperature of the system cannot ordinarily be easily controlled, but the flow rate of mixture into the system and the velocity of the lower belt 115, can and should be correlated and regulated.

If the speed of the lower belt 115 is too fast, the foaming mixture will be carried through the tunnel 210 before the bun can be molded properly, and the resulting bun will not be rectangular. On the other hand, if the speed of belt 115 is too slow, the foam front of the rising mass will tend to back up in the tunnel 210 and roll back over fluid which has not yet begun to rise. In such a case, the resulting bun will contain irregularities and will obviously not be isotropic.

In addition, it is also desirable to adjust the system to keep the foam front as nearly flat as possible, since this will provide for foam at a constant rate, and since this will help provide for isotropicity of the resulting bun. Accordingly, the tunnel 210 may be selectively inclined at an angle such as to maintain a flat or substantially flat foam front, in correlation with the speed of the lower belt 115 through the tunnel, and these parameters must be correlated with the flow rate (and constituency) of the mixture deposited by the spout 19.

As will be apparent from a study of FIG. 2, the finished rectangular bun passes out of the exit end 224 of the tunnel 210, and onto the roller bars 250 of the transitional conveyor section 202. The conveyor belts in the tunnel mold section 200 push the bun across the roller bars 250, and onto the saw conveyor belt 252 in the saw assembly 204. It is a function of the saw conveyor belt 252 to carry the finished bun under the saw blade 254, and thereafter to carry the severed billets away from the saw blade 254.

It should further be noted that the bottom conveyor belt 115 is disposed about a front roller 258 mounted ahead of the pouring spout 19, and a rear roller 260 mounted immediately below the rear roller 262 which supports the side conveyor belt 119. Roller 260 is driven by an electric motor 264, and rotation of roller 260 may be seen to apply rotary power to roller 262 by means of beveled gears 266. It should be further noted that the saw conveyor belt 252 is disposed about front and rear rollers 270 and 272. The belt 252 is driven by power applied to roller 270 through a suitable drive belt 274 which is connected to a suitable electric motor 276. It is preferable that belt 252 be rotated in synchronism with belts 115, 119 and 120. Accordingly, motors 264 and 276 are preferably both controlled by the same control circuit 278.

It should be further noted that the saw 254 is mounted on a saw carriage 280 which operates to drive the saw blade downward to sever each billet from the bun departing the tunnel at its exit end 224. The saw blade 254 may be actuated downward by any suitable conventional means, such as by compressed air.

It should also be noted that the bun will continuously leave the exit end 224 of the tunnel, irrespective of the action of the saw blade 254. Accordingly, the saw carriage 280 preferably travels with the bun, as the saw blade 254 moves downwardly to cut off each billet. In this manner, the saw blade 254 will not impede movement of the bun out of exit end 224 of the tunnel. Accordingly, the saw carriage 280 is preferably fitted with three rollers 282, 284 and 286, which permit the saw carriage 280 to move back and forth along the saw assembly 204 without impeding movement of the saw conveyor belt 252. More particularly, the belt 252 is disposed over rollers 282 and 286, and under roller 284, so that when saw blade 254 reaches the bottom of the bun it will not sever belt 252.

Upon completely severing the bun, however, the saw blade 254 immediately rises to the top of the carriage 280 and the carriage 280 then travels backwards over the approaching bun towards the exit end 224 of the tunnel 210. When the saw carriage 280 reaches roller 270, the saw blade 254 is again actuated to move downward to cut off the next billet. The severed billet is, in each case, carried away from the saw blade 254 and saw carriage 280 by the travel of belt 252 towards and over the rear roller 272.

Figure 3:
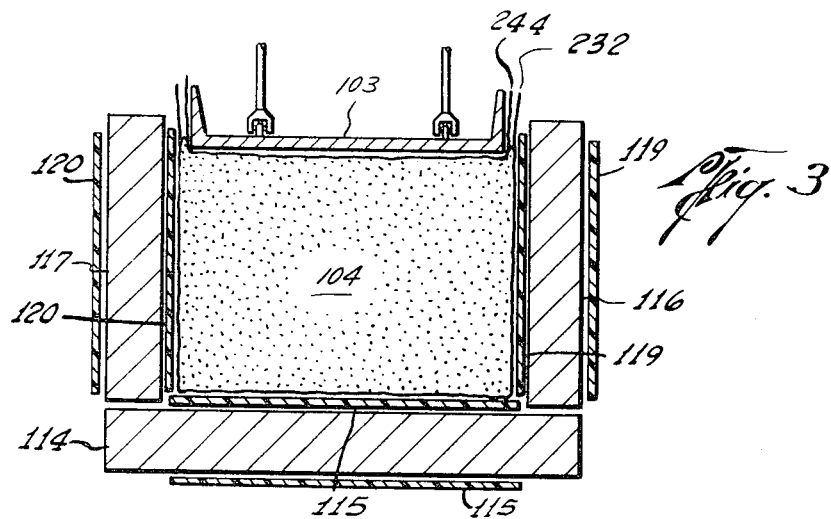
FIG. 3 is a pictorial representation, partly in cross section, of a portion of the system depicted in FIG. 2.
Figure 11:
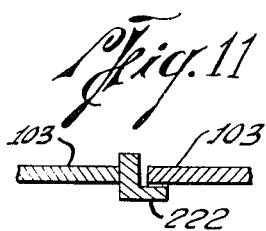
FIG. 11 is a view in partial cross-section taken through the circle 12 shown in FIG. 2.

Referring now to FIG. 3, there may be seen a cross-sectional representation, partly pictorial, of the main components of the tunnel 210 depicted generally in FIG. 2 and FIG. 5. In particular, there may be seen a functional representation of the bottom panel 114, the two side panels 117 and 116, and and the top panel 103. As suggested in FIG. 3, the two side panels 117 and 116 and are vertically positioned to define a rectangular cavity having preselected dimensions. Although side panels 117 and 116 are adjustably mounted relative to each other, they are rigidly positioned with respect to the bun 104 contained therebetween.

On the other hand, as suggested in FIG. 3, although the top panel 103 is adjustably positioned relative to the bottom panel 114, it is spring-loaded to be yieldably urged downward to a preselected extent to maintain homogeneity of the bun 104, and to prevent the cells therein from assuming a flattened shape. In other words, it is necessary that the top panel 103 compress the rising foam sufficient to require the foam to flow into the top corners of the tunnel 210, since this is what gives the bun a rectangular cross section. It is also necessary that this compression be sufficient to cause the cells to be generally equally spaced throughout, since this aids in giving the resulting bun homogeneity. However, it is also necessary that the top panel 103 yield when the upward pressure exceeds a preselected set point, since this prevents flattening of the cells of the bun, and aids in giving the bun isotropicity. As may further be seen, the bottom paper 232 is disposed between the bun 104 and the bottom and side panels 114, 116 and 117 in a generally U-shaped manner. The top paper 244 is disposed in a generally U-shaped manner about the top panel 103, so as to be urged down against the bun 104 by the top panel 103. Since the top paper 244 is substantially narrower than the bottom paper 232, the edges of the two papers will be substantially coincident.

It should be noted that there is a bottom conveyor belt 115 which is disposed about the top and bottom surfaces of the bottom panel 114 between the bottom panel 114 and the bottom paper 232. Further, there are side conveyor belts 119 and 120 which are disposed about the right and left surfaces of the side panels 117 and 116, between the side panels 117 and 116 and the bottom paper 232. As hereinbefore explained, these conveyor belts function to draw the bun 104 and bottom paper 232 through the tunnel, while the bun 104 itself acts to pull the top paper 244 along with it through the tunnel after the bun 104 achieves substantially its full cross-sectional shape, and adheres to the top paper 244.

Figure 4:
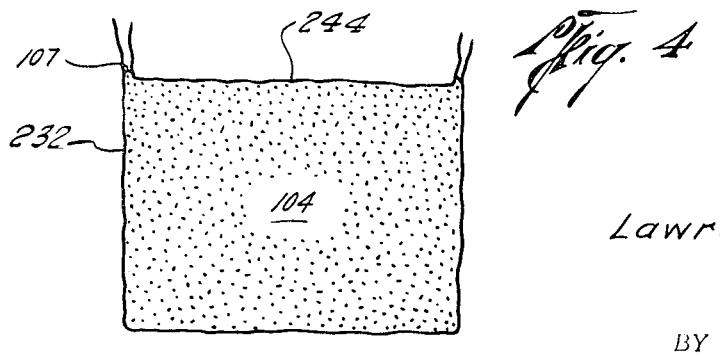
FIG. 4 is a pictorial representation of an end view of an isotropic polyurethane billet of the type produced by means of the present invention.

Referring now to FIG. 4, there may be seen a pictorial representation of a bun 104 having a substantially rectangular cross section. It can be further seen how the top and bottom papers 244 and 232 are fixed tightly to the bun 104, except at the upper corners. This is due to the fact that the top panel 103 is substantially narrower than the space between the two side panels 117 and 116, and that the bottom paper 232 tends to lie flat against the side panels 117 and 116 while the top paper 244 tends to lie flat against the sides of the top panel 103. Thus, the portions of the bun 104 between the gaps between the top panel 103 and the side panels 117 and 116 tend to rise slightly above the bottom surface of the top panel 103 to form "rabbit ears." The height of these rabbit ears can be observed from a position above the tunnel, and indicates to trained observers the condition of the bun 104 along the length of the tunnel. It should further be noted that the papers 232 and 244, being fixed to the surfaces of the bun 104, tend to aid in the "curing" process even after the bun 104 has been removed from the tunnel, and has been cut into billets and stored.

Referring now to FIG. 5, there may be seen a more detailed representation of the portion of the tunnel generally depicted in FIG. 3. In particular, there is shown in cross-sectional view, four longitudinally arranged struts 110–113, with the bottom panel 114 disposed between the two lower struts 111 and 112 by suitable means not depicted. As hereinbefore stated, the bottom conveyor belt 115 is arranged immediately about the bottom panel 114.

Also disposed immediately above the bottom panel 114, and the bottom conveyor belt 115, may be seen the side panel assemblies 116 and 117, which are adjustably but rigidly positioned by means of worm gears 118 to define the vertical sides of the tunnel. Two side conveyor belts 119 and 120 are seen located immediately adjacent and about their respective side panels 116 and 117.

Disposed across the tops of the two top struts 110 and 113, is a truss-like frame 121 for supporting the top panel 103 to provide the top of the tunnel. More particularly, the top panel 103 may be seen to be connected by knuckle joints 123, 124 to support rods or shafts 125, 126 which are threadedly interconnected with cylinders 127, and 128. As may further be seen, cylinders 127 and 128 are preferably linked together by an endless sprocket chain 129 so that rotation of cylinder 127 will also rotate cylinder 128 to the same extent, to provide that top panel 103 will be held in a horizontal position irrespective of its vertical position.

Also disposed about shafts 125 and 126 and above cylinders 127 and 128, are springs 130 and 131 to urge cylinders 127 and 128 (and therefore shafts 125 and 126) downwardly towards the tunnel. Accordingly, this arrangement provides that the top panel 103 will be spring loaded downward towards the bottom conveyor belt 115 as hereinbefore described.

Referring now to FIG. 6, there may be seen a pictorial representation, partly in cross section of a portion of the apparatus depicted in FIG. 5. In particular, the top panel 103 may be seen to be connected to a plate 140 having an eye projection 141 containing pin 142. The threaded shaft 125 depicted in FIG. 5, may be seen to be provided with a forked end 143 having a borehole fitting about pin 142, to thus provide the knuckle joint 123 depicted in FIG. 5. The threaded cylinder 127 may be further seen to be provided with flange 144 having sprocket teeth 145 for engaging chain 129 depicted in FIG. 5. Cylinder 127 may also be seen to be provided with a crank handle 146 for rotating cylinders 127 and 128 (see FIG. 5).

As hereinbefore stated with respect to FIG. 5, the top panel 103 is generally supported by a truss-like brace 121. This truss-like brace may be seen in FIG. 6, to be composed of a bottom strut 147 and an upper strut 148. Cylinder 127 is disposed through apertures in both the upper and lower struts 148 and 147, and rotatably mounted therein by means of bushings 149 and 150. A thrust bearing 151 is preferably provided to further support cylinder 127 by being disposed between the lower plate 147 and the flange 144 to facilitate rotation of the cylinder 127. As further may be seen in FIG. 6, spring 130 is disposed about cylinder 127, and between the upper strut 148 and the upper surface of flange 144, to resist upward movement of the top panel 103 of the tunnel.

Referring now to FIG. 7, there may be seen a pictorial representation, partly in cross section, of the entrance 250 of the tunnel. More particularly, FIG. 7 shows the bottom longitudinal struts 111 and 112, and the bottom panel 114, previously depicted in FIG. 5. In addition, the two side panels 116 and 117 may be seen disposed adjacent the right and left side conveyor belts 119 and 120, and U-shaped bottom paper 232, which is depicted in FIG. 5, and the roll 242 of the top paper 244 previously depicted in FIG. 2.

As may be further seen, a creasing roller 248, having a rounded or hemispherical creasing knob 290 and 292 at each end, is located below roller 246 to receive the top paper 244 from the roll 242. As arranged, the top paper 244 passes between a creasing plate 294 and 296 located a preselected close spacing from each creasing knob 290 and 292 on the creasing roller 248. The top paper 244 passes over each knob 290 and 292, which act to hold up the edges of the top paper 244 and thus cause it to assume a U-shape as it passes into the tunnel. The U-shaped top paper 244 thereafter continues through the tunnel but pressed up and around the bottom and sides of the various top panels 103 depicted in FIG. 2, as previously shown in detail in FIGS. 3 and 4.

Referring now to FIG. 8, there may be seen a pictorial representation of the functional details of that portion of the apparatus which permits the inclination of the tunnel to be varied selectively, while maintaining a preselected spacing between the bottom conveyor belt of the tunnel and the pouring spout of the mixing nozzle hereinbefore described. More particularly, a support frame may be seen to be provided for the purpose of supporting the entrance end of the tunnel, which support frame includes bases 300 and 302, each having two vertical guide rods 304, 306, 308, and 310 and a pair of brackets 312 and 314 which are slidably disposed about each pair of guide rods 304 to 310. A pair of worm gears 316 and 318 are disposed in bases 300 and 302, and threadably through brackets 312 and 314, to raise or lower brackets 312 and 314 by virtue of their own rotation. Worm gears 316 and 318 are rotated by a drive shaft 320 which is rotated by a drive wheel 322 linked by a belt 324 to drive motor 326. Motor 326 may be selectively rotatable in either direction, by conventional control means not depicted.

As further depicted in FIG. 8, brackets 312 and 314 may be seen to be connected by a pair of lateral struts 328 and 330 which support the lower longitudinal struts of the tunnel mechanism, depicted in FIGS. 2, 5, and 7, and represented in FIG. 8 by strut 111. Thus, actuation of motors 326 will turn worm gears 316 and 318 to raise or lower the tunnel depending upon the direction of rotation of motor 326.

It will be noted that the spout 19 depicted in FIGS. 2 and 8 is bent in an angular manner relative to the bottom paper 232 and lower conveyor belt 115. The particular angle of bend, of the spout 19, is not a critical factor in the depicted process. However, at least some angle is necessary to prevent the fluid being discharged from pouring down upon the bottom paper 232 so as to spatter or to trap air, since trapped air bubbles in the fluid on the bottom paper 232 will cause undesirable cavitation in the resulting bun.

Moreover, it is important that the spacing between the tip of the spout 19 and the bottom paper 232 be preselected so that spattering and air entrapment will be substantially eliminated. As hereinbefore stated, it may be desirable to vary the inclination angle of the tunnel 210. However, as will be hereinafter discussed in detail, it is preferable to maintain the spacing between the spout 19 and the bottom paper 232 during any variation of the inclination angle of the tunnel 210, although it is immaterial whether or not the angular relationship of the spout 19 tip is maintained (provided the tip is kept at some minimum angle thereto). The particular spacing between the spout 19 and the bottom paper 232 is governed largely by the viscosity and the flow rate of the fluid being discharged from the spout 19.

As hereinbefore stated, it is necessary to maintain a fixed spacing between the pouring spout 19 and the bottom conveyor belt 115. This is achieved by mounting the mixing nozzle 18 on a traverse cradle 340 which longitudinally slides back and forth along traverse rail 342 disposed between rail holders 344 and 346 mounted on the aforementioned lateral struts 328 and 330. Suitable drive mechanism (not depicted) may be provided to drive the cradle 340 back and forth along the traverse rail 342, and across the width of the tunnel, to spread the mixture in the U-shaped bottom paper (not depicted) located on the bottom belt 115. Since the mixing nozzle 18 and pouring spout 19 are unitarily combined with the lateral struts 328 and 330, raising and lowering the tunnel will also raise and lower the mixing nozzle 18 and pouring spout 19 and thus maintain a fixed spacing between the tip of the spout 19 and the bottom conveyor belt 115, irrespective of the inclination of the tunnel.

As previously stated, it is necessary to carefully and continuously monitor and regulate the proportions of the resin, PAPI, etc., with great accuracy in order to produce a bun having the chemical and physical characteristics sought to be obtained. Referring now to FIG. 9, there may be seen a functional representation of a signalling system for transmitting to a centrally located indicator panel or board (not depicted) indications in mass transfer units of the amounts of each constituent being combined in the manner hereinbefore depicted in FIG. 1. In particular, there may be seen positive displacement gear pumps 30–36 for transferring resin, PAPI, silicone, and catalyst, from tanks 1–5 to the line blender 11 and mixing nozzle 18, as previously represented in FIG. 1, and a high-pressure turbine pump 37 for transferring freon between tank 6 and the mixing nozzle 18. Pumps 30–36 are driven through gear boxes 50–56 by D.C. motors 40–46, respectively, which are preferably controlled from a central control location or point (not depicted) adjacent the aforementioned indicator board. The regenerative turbine pump 37 is driven by an A.C. motor 47 which may be operated at a constant speed.

It will be apparent that the rotation of the pump shaft may not be linearly proportional to the mass transfer units provided by pump 37. Accordingly, the output shaft from the gear box 50 is also connected to a variable ratio speed changer 38, as well as to pump 30. It is the function of the variable ratio speed changer 38 to provide output shaft rotation for driving a suitable electrical pulse generator 48 to thus produce electric pulses directly related to the number of mass transfer units delivered by the resin pump 30. As depicted in FIG. 9, these electrical pulses are transmitted by conductor 50A to the aforementioned indicator board where resin transfer can be continuously observed and recorded. If it is desired to adjust the rate of resin transfer, the speed of pump 30 can be adjusted by means of a suitable electrical control signal or voltage generated in a conventional manner at the aforementioned control point, and transmitted to the D.C. motor 40 by way of conductor 40A.

As may also be seen, transfer of PAPI in line 13 (hereinafter called PAPI-A), is monitored and controlled in the same manner as provided for resin from tank 1. The D.C. motor 41, which is controlled by an electrical signal in conductor 41A, drives pump 31 by means of gear box 51. The output from gear box 51 is also connected to drive another variable ratio speed changer 39 which in turn, drives a suitable electrical pulse generator 49 to produce electrical pulses directly coincident with the indicative of the units of PAPI-A being transferred through line 13 and to line 16. These pulses are transmitted by way of conductor 31A to the aforementioned indicator board for observation and recording.

As may further be seen in FIG. 9, pumps 32–36 are similarly driven by D.C. motors 42–46 through gear boxes 52–56. However, it should be noted that the quantities of fluid being transferred by these pumps are relatively small, and thus the output shafts of gear boxes 52–56 rotate too slowly to cause their associated variable ratio speed changers 60–64 to produce proper angular velocities. Accordingly, speed changers 60–64 are preferably connected to the armatures of motors 42–46, respectively, rather than to their associated gear boxes 52–56, to cause their associated pulse generators 65–69 to produce accurate signals in conductors 32A–36A as hereinbefore described. Motors 42–46 may be controlled by suitable electrical signals produced at the control point and transmitted by way of conductors 42A–46A.

It should therefore be noted that the pulses produced by the various pulse generators 48, 49, and 65–69, do not necessarily all represent identical mass transfer rates. In other words, the speed changers 38–39 and 60–64 determine what the outputs of the pulse generators 48–49 and 65–69 shall represent, assuming that all pulse generators 48–49 and 65–69 are the same type of component. Thus, each pulse in conductor 50A may represent one one-hundredth of a pound per minute of resin, whereas each pulse in conductor 32A may represent one ten-thousandth of a pound per minute of silicone.

Referring now to the freon transfer system depicted in FIG. 9, there may be seen that the turbine pump 37 delivers freon from tank 6 to a pressure relief valve 70 which is connected to deliver freon either to a turbine flow meter 71, or back to tank 6, to establish a preselected fixed line pressure therefrom irrespective of variations in flow rate. The fluid through the turbine flow meter 71 is passed to flow regulator 72 which is controlled by a servo motor 73. The turbine flow meter 71 is also connected to generate electrical pulses directly indicative of freon volume, and to apply these pulses to the input of an adjustable frequency-to-voltage integrator circuit 74. The scaled output voltage generated by the integrator 74 is preferably applied to a suitable voltage-to-frequency converter 75, which sends to the indicator board, by way of conductor 75A, pulses which are directly indicative of the freon mass transfer units delivered through the flow regulator 72 to the mixing nozzle 18. Freon flow to the mixing nozzle 18 may be controlled by a suitable control signal, from the remote control center, sent to the servo motor 73 by way of conductor 73A.

Figure 10:
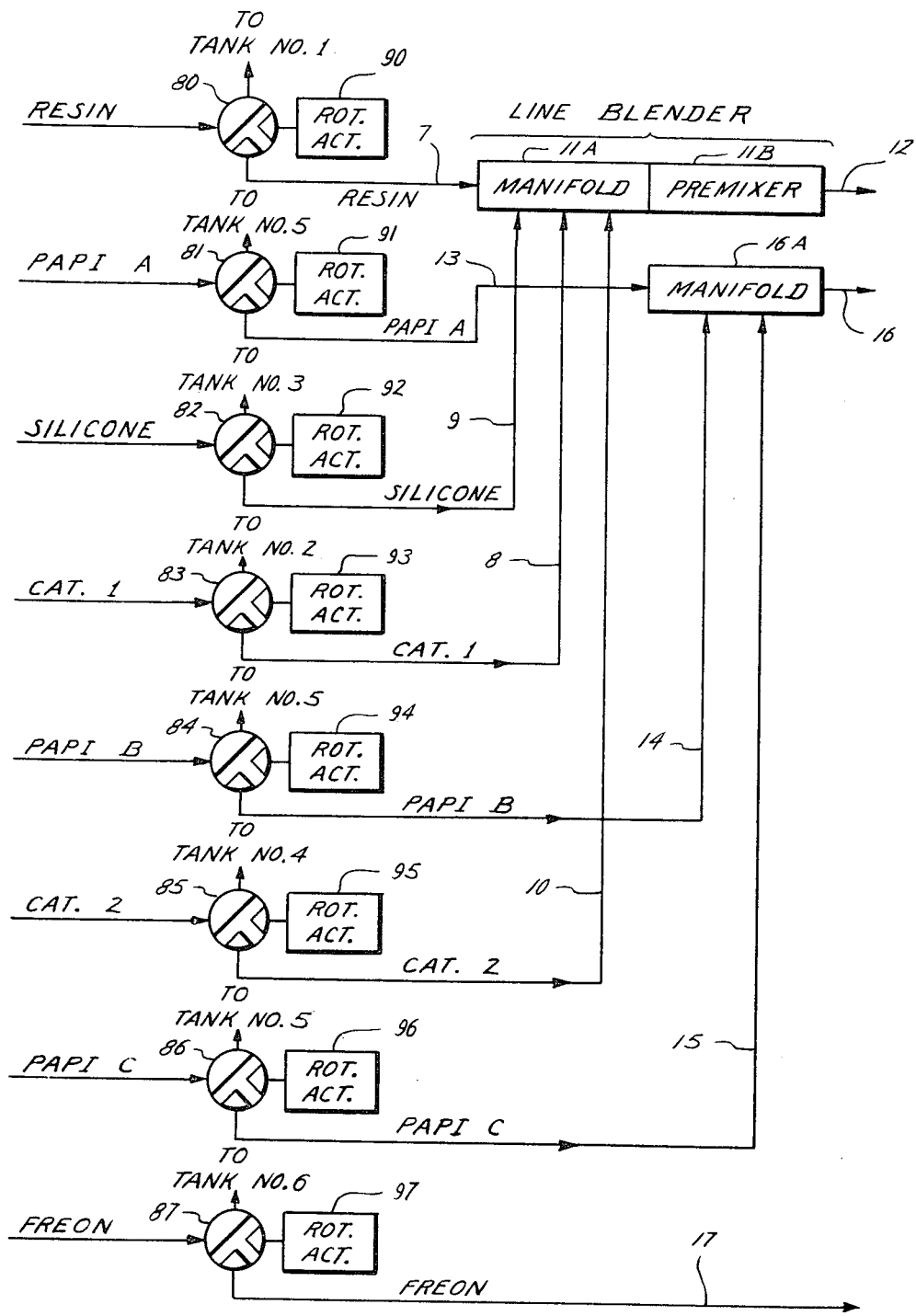
FIG. 10 is a functional representation of a further portion of the flow system generally depicted in FIG. 1.

Referring now to FIG. 10, there may be seen a functional representation of a further portion of the flow system generally depicted in FIG. 1, wherein provision is made for recirculating the various constituents depicted in FIG. 1, in order to stabilize the temperature of the fluids and the flow rates of the subsystems before passing the fluids into the mixing nozzle 18. In particular, three-way valves 80–87 are interconnected between pumps 30–36 and the flow regulator 72, and lines 7, 13, 9, 8, 14, 10, 15, and 17, respectively. Each three-way valve 80–87 may be controlled by a solenoid-operated rotary actuator 90–97 which, in turn, is actuated by a suitable electrical signal from the remote control point hereinbefore mentioned.

Accordingly, valve 80 may be positioned to route resin either to line 7 or back to tank 1. The other valves 81–87 may be similarly controlled and positioned.

As shown in FIG. 10, the line blender 11 depicted generally in FIG. 1 is composed of a manifold 11A and a premixer 11B. Lines 7–10 are connected to the manifold 11A which is directly connected to the premixer 11B. The output from the premixer 11B is connected to the mixing nozzle 18 by way of line 12.

As hereinbefore stated, valves 81, 84, and 86 are connected to lines 13–15, respectively, which are connected to a manifold 16A not specifically depicted in FIG. 1. The output of the manifold 16A is connected to the mixing nozzle 18 depicted in FIG. 1 by way of line 16. Valve 87 is connected directly to the mixing nozzle 18 by way of line 17.

It is desirable to calibrate the pulses produced by pulse generators 48–49 and 65–69, and by the converter 75, against known amounts of mass transfer. Accordingly, the pulses produced by each such pulse generator may be connected to a suitable scaler device which is adjusted to deliver pulses having a known relationship to the amount of mass transfer produced. In other words, it would be known that each revolution of the pump shaft would deliver so many mass transfer units, irrespective of how many electrical pulses may be produced by its associated pulse generator. Accordingly, the associated scaler device should be adjusted to deliver a proportional number of pulses for each unit of mass transfer being delivered by the pump during each pump shaft revolution.

It is another feature of the present invention to provide a tunnel mold having a top panel arrangement, as well as a bottom panel and side panels. It is a further feature to provide an arrangement of top pans as depicted in FIG. 2 wherein the top pans are each provided with a lip which under-rides the adjacent pan, so as not to impede travel of the bun through the tunnel. It is also a feature of the present invention to provide segmented side and top panels, so as to permit the dimensions of the tunnel to be adjusted along its length to provide for greater control over the foam and the resulting bun in the tunnel.

A particular feature is that the rectangular cross-sectional shape of the polyurethane bun is particularly provided by so controlling the foaming reaction so that, in the overall context of the reaction period, the gel point of the foamed polymer mass is proximate in time to the "crown point" (the point in time) at which the rising of the foam is substantially completed. If the gel point too far precedes the crown point, and if the rising action of the foam continues after the foamed mass is gelled and set, a rupturing of the foam often occurs as the foaming mass tends to expand to fill the corners of the rectangular tunnel. Although manipulation of the relative occurrence of the gel point and the crown point is possible by selection of tunnel length and inclination, variation of conveyor speed, and by altering the reactant's combination and proportion, the factor of tunnel length is for practical purposes limited in any single foaming apparatus.

It has been surprisingly found that incorporation of small amounts of suitable flowing agents in the foam receipe tends to prolong the plastic nature of a rising foam bun such that the foam does not set so rigidly prior to completion of the rising action. These flowing agents, though they do not measurably alter the beneficial properties of the ultimate foam product, do perform a type of plasticizing action during the foaming procedure, in that the flowability of the cellular matrix of the foam is preserved during the foaming reaction. Accordingly, as the foam in the final stages of its rising action expands to a rectangular cross section, the cellular matrix tends to flow in the direction of the expanding action and without rupture. This plasticizing function is apparently, however, temporary and the flowing agents do not appear to impart a plasticized character to the ultimate product. It has been found that ultimate foams incorporating such flowing agents are characterized by more uniformly spherical cells in these portions of the foam where stretching would normally have otherwise occurred.

Generally, flowing agents are employed in small amounts sufficient to produce flowability during the last rising stages of the foam reaction and to preserve the flowability of the cellular matrix. Suitably, less than five per cent by weight of flowing agent based upon the weight of the polyol or "resin" is employed. Eminently satisfactory results are obtained at significantly lower concentrations down to about 0.25 percent by weight based upon the resin weight. Most preferably, however, from about 0.5 to about two percent by weight of flowing agent based upon the resin is employed.

Use of flowing agents, hereinafter disclosed, in amounts substantially in excess of those prescribed above often result in a production of a softer foam in which the physical properties are not generally desirable. Furthermore, as the proportion of flowing agent increases to such an extent as to effect ultimate foam properties, the flowing agent appears to lose its effectiveness in promoting the flowability of the cellular matrix. Thus it has been found that if flowing agents are added in amounts up to 15 percent by weight based upon the weight of the resin, the physical properties deteriorate and rectangularity of the bun becomes again more difficult to achieve.

The flowing agent may be suitably added directly into the foam formulation. But because of the small quantities used, it is most efficient to add the flowing agent in admixture with another reactant. Suitably the flowing agent is incorporated with the amine catalyst, and by such a means of addition, the flowing agent generally affords the added benefit of furnishing lubricity and body to this catalyst stream.

Typical flowing agents which impart the desired flowability to the foam matrix include the long chain fatty acids and oils, which are otherwise compatible with the foam formulation, particularly the compatible naturally occurring oils which generally comprise the mixed triglycerides of long chain fatty acids. Highly preferred is castor oil which is a triglyceride mixture containing a predominant amount of rinoleic acid. Castor oil exhibits a ready compatibility with the other foam formulation components, and by virtue of its ready availability and inexpensive cost is an ideal flowing agent.

As stated above, the flowing agents which are employed to promote the flowability of the cellular matrix must be compatible with the other formulation components, i.e., the flowing agents cannot be such that they form a separate phase upon their addition to the system. For example, in PAPI-containing foam formulations, such compounds as various of the stearate esters and triglycerides, which otherwise might be potential flowing agents serve as gross antifoamers and foam suppressors by creating a separate phase in the formulation. Although the explanation for this antifoam effect is not known, it is postulated that the interface produced by the stearate draws the foaming surfactant to the interface and tends to inhibit the overall foaming action.

Many other modifications would be apparent from a consideration of the methods and apparatus hereinbefore described, and depicted in the accompanying drawings. Accordingly, the forms of the present invention described herein, and illustrated in the accompanying drawings, are intended as examples only, and are not intended as limitations on the present invention.

What is claimed is:

1. Apparatus for continuously manufacturing isotropic foam stock of polyurethane and the like, comprising
    mixing means for continuously receiving and commingling a plurality of different interactable liquid inputs to form a single continuous output stream of a substantially homogeneous reacting liquid which progressively expands and solidifies into foam stock,
    an elongate hollow and open-ended molding means having one open end positioned to receive said stream of reacting liquid and another opposite open discharge end and further having flat interior surfaces forming a generally rectangular interior cross section for providing said foam stock with substantially flat longitudinal surfaces and a generally rectangular lateral cross section, means for resiliently mounting the top interior surface to yieldably engage foam stock,
    conveyor means along the sides and bottom of said molding means for continuously advancing foam stock longitudinally through the interior of said molding means at a velocity related to the expansion and solidification of said reacting liquid into said foam stock so that said foam stock expands to engage said flat surfaces,
    means interconnected with said mixing means for pouring said output stream of reacting liquid into said one end and upon the floor of said molding means substantially before said expansion and solidification of said reacting liquid, and
    cutting means having a moving surface for continuously receiving foam stock emerging from said discharge end of said molding means and for cutting such foam stock into billets of substantially a preselected length while such foam stock is on said moving surface, and
    means for synchronously operating said cutting means and conveyor means.

2. The apparatus described in claim 1, further comprising wrapping means interconnected with said molding means and conveying means for continuously supplying a paper-like liner to said molding means for fixed application to the exterior longitudinal surfaces of said foam stock.

3. The apparatus described in claim 2, further comprising tilting means interconnected with said molding means and distributing means for elevating said one end of said molding means relative to said discharge end.

4. The apparatus described in claim 3, wherein said top interior surface of said molding means comprises
a plurality of panels linearly arranged above and along said floor portion and each being yieldable in response to vertical expansion of reacting liquid and solidifying foam stock in said molding means, and
said resilient mounting means includes elastic means interconnected with said top panels and arranged to yieldably oppose upward movement of said top panels.

5. The top portion of said molding means described in claim 4, wherein said elastic means comprises
a pair of helical spring members mounted on each of said top panels in side-by-side relationship to each other for opposing upward movement of said each top panel, and
adjustment means for selectively subjecting both of said spring members in each pair to the same magnitude of preselected compression for maintaining each of said top members in a laterally level position with respect to said floor portion of said molding means.

6. The top portion of said molding means described in claim 5, wherein each of said top panel members is positioned between and spaced an equal distance from said sidewall surfaces to permit limited expansion of said solidifying foam stock upwardly between said sidewall surfaces and the edges of said top panel members adjacent thereto.

7. The top panel members described in claim 4, wherein each of said top panel members has a protruding lip aimed toward said discharge end of said molding means and extended under the adjacent edge of the panel next adjacent thereto.

8. Apparatus for continuous manufacture of isotropic foam stock of polyurethane or the like, comprising:
means forming a tunnel mold including side and bottom endless belt means for containing the bottom and sides of foam stock,
means for providing a liner between foam stock and said belt means, said side and bottom belt means being in overlapping relationship and closely spaced to maintain substantially square corners at the bottom of foam stock,
means for providing a top for said tunnel mold, said means including a flat plate means with side portions spaced inwardly relative to said side belt means to permit expansion of foam stock in the space therebetween,
means for providing a liner between foam stock and said plate means, and
means for resiliently urging said plate means downwardly to compress foam stock sufficient to permit expansion of foam stock between the top plate means and side belt means.

9. The apparatus of claim 8 and further including means for adjusting the level of said tunnel mold to an inclination where the entrance end is elevated above the exit end for maintaining a substantially flat foam front.

10. The apparatus of claim 9 and further including outlet means for discharging foam stock on said bottom belt where said outlet means has a preselected spacing relative to said bottom belt, said outlet means and said bottom belt means being coupled to said adjusting means so that inclination of said tunnel mold does not affect the spacing between said outlet means and said bottom belt means.

11. The apparatus of claim 10 and further including pump means for supplying constituent ingredients to said outlet means, means coupled to each of said supply pump means for deriving electrical pulses scaled to mass transfer units delivered by said pump means.

12. The apparatus of claim 8 wherein said flat plate means are comprised of a plurality of panels having overlapping portions with the forward end of one panel being over the rearward end of an adjacent panel.

* * * * *